(12) United States Patent
Gupta

(10) Patent No.: US 11,102,269 B1
(45) Date of Patent: Aug. 24, 2021

(54) MEDIA STREAM PATCHING USING DYNAMIC FRAME PREDICTION

(71) Applicant: Amazon Technologies, Inc., Seattle, WA (US)

(72) Inventor: Rushil Gupta, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/026,985

(22) Filed: Sep. 21, 2020

(51) Int. Cl.
| | |
|---|---|
| H04L 29/06 | (2006.01) |
| G06N 20/00 | (2019.01) |
| H04N 21/24 | (2011.01) |
| H04N 21/845 | (2011.01) |

(52) U.S. Cl.
CPC ............. *H04L 65/80* (2013.01); *G06N 20/00* (2019.01); *H04L 65/4084* (2013.01); *H04N 21/2402* (2013.01); *H04N 21/8456* (2013.01)

(58) Field of Classification Search
CPC ... H04L 65/80; H04L 65/4084; H04L 65/607; H04L 65/602; H04L 43/0888; H04L 65/608; H04N 21/8456; H04N 21/44209; H04N 21/64322; H04N 21/2402; H04N 21/23439; H04N 21/2387

See application file for complete search history.

(56) References Cited

U.S. PATENT DOCUMENTS

| | | | |
|---|---|---|---|
| 7,643,422 B1* | 1/2010 | Covell | H04N 21/6587 370/235 |
| 2003/0067872 A1* | 4/2003 | Harrell | H04N 21/23406 370/229 |
| 2011/0249127 A1* | 10/2011 | Zhang | H04N 17/004 348/192 |

* cited by examiner

*Primary Examiner* — Michael A Keller
*Assistant Examiner* — Thao D Duong
(74) *Attorney, Agent, or Firm* — Nicholson De Vos Webster & Elliott, LLP

(57) ABSTRACT

Techniques for media stream patching using dynamic frame prediction are described. A frame loss detector of a decoder can detect a frame loss condition of an input media stream and cause a request for a substitute frame to be sent to a frame predictor. The frame predictor uses one or more machine learning models to infer a substitute frame, which is inserted into the media stream for further processing and distribution.

13 Claims, 10 Drawing Sheets

MEDIA STREAM PATCHING USING DYNAMIC FRAME PREDICTION

BACKGROUND

Various protocols exist for streaming live or pre-recorded media over Internet Protocol (IP)-based networks such as the internet. Exemplary protocols include Real-time Transport Protocol (RTP), Real-Time Message Protocol (RTMP), Dynamic Adaptive Streaming over HTTP (DASH), and HTTP Live Streaming (HLS). One common aspect of each of these protocols is the conveyance of timing information to allow the recipient of the stream to correctly process the various stream components such as audio, video, captions, etc. both individually and together. For example, using the timing information, the recipient can determine when and how long to display a particular video frame relative to other video frames. The recipient can also determine which audio data is to be rendered during the display of a given video frame so that the various components remain synchronized.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for media stream patching using dynamic frame prediction. According to some embodiments, a next frame from a sequence of frames of a media stream can be predicted based on use of a machine learning model and ones of the frames of the media stream. The predicted frame can be inserted into the media stream in place of a frame that did not arrive in time for processing, e.g., the transcoding of the media stream. Accordingly, in some embodiments, when network delays or other failures limit elements of a media stream from arriving at a particular processing point (e.g., at a decoder of a transcoder), a substitute element (e.g., a frame) can be generated by use of a machine learning model and used in its place. Thus, instead of experiencing "glitches" such as black frames or repeated frames, embodiments can predict certain frames and provide relatively uninterrupted/unaffected playback of the media stream for downstream clients with "filled in" content that is typically extremely similar to the actual, missing frames.

Figure 1:
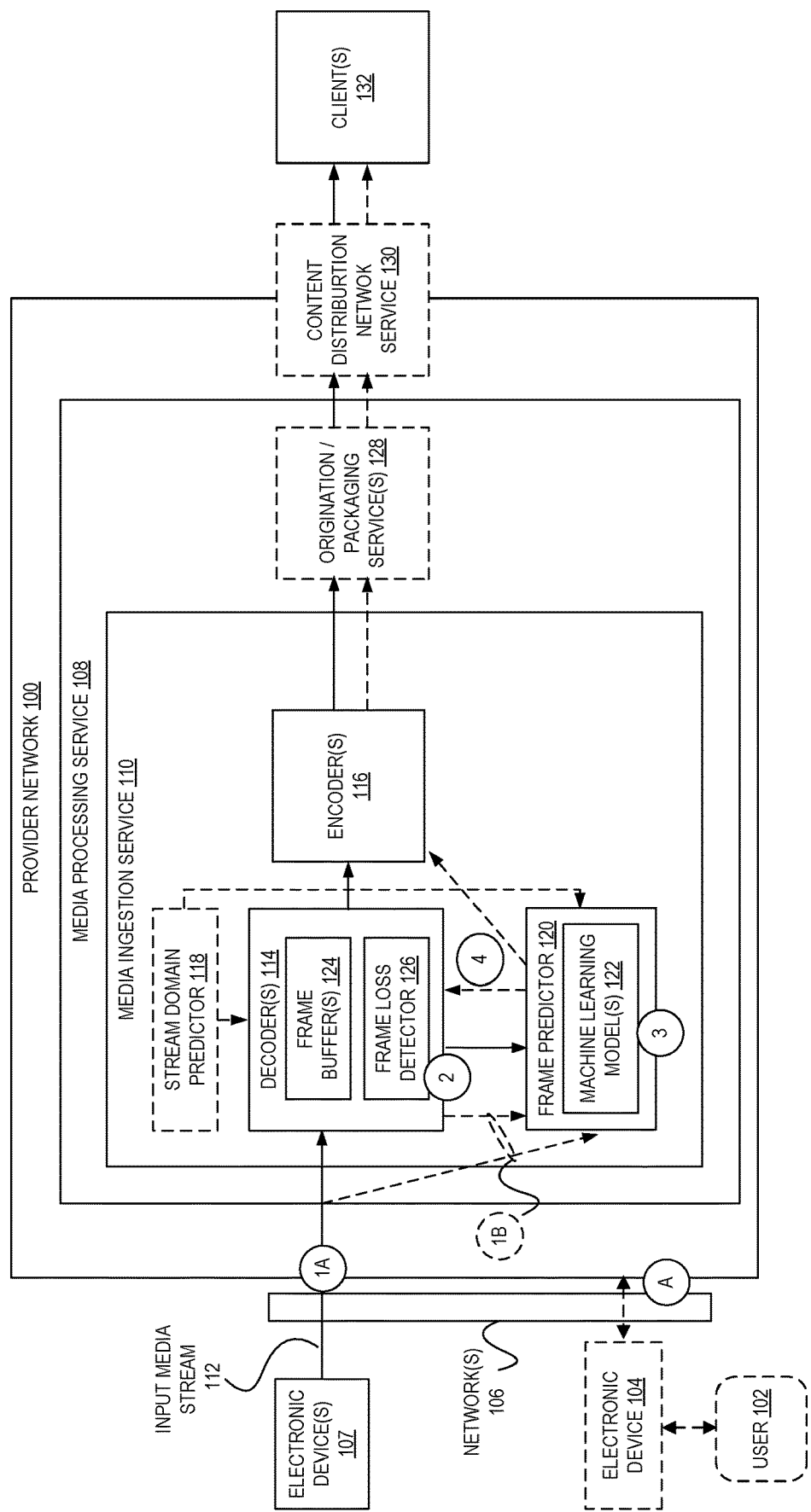
FIG. 1 is a diagram illustrating an environment for media stream patching using dynamic frame prediction according to some embodiments.

FIG. 1 is a diagram illustrating an environment for media stream patching using dynamic frame prediction according to some embodiments. In FIG. 1, a media processing service 108 (including a media ingestion service 110 and an origination/packaging service 128) is implemented within a provider network 100 that can create media streams that can be directly sent to downstream clients 132 or indirectly provided via a content delivery network (CDN) service that may be a part of the provider network 100 or separate from the provider network 100. The media processing service 108 can be implemented using hardware, software, or a combination of both and may be implemented using one or more computing devices in a single location or distributed amongst computing devices in multiple locations (e.g., data centers, cities, regions, or the like).

The media ingestion service 110 in some embodiments receives an "input" media stream 112 from one or more electronic devices 107 via one or more networks 106 (e.g., the interna). The media ingestion service 110 can receive media streams from a variety of sources via various protocols such as Real-time Transport Protocol (RTP), Real-Time Message Protocol (RTMP), Dynamic Adaptive Streaming over HTTP (DASH), and HTTP Live Streaming (HLS). The media stream may carry elements of visual data, audio data, or combinations of both.

The media ingestion service 110 can further decode and encode the received media streams into different media formats (e.g., changing the form of compression used on the video and/or audio) and prepare the media for distribution using one or more protocols that may be different than the protocol via which the input media stream 112 was originally received. After processing a received input media stream 112, the media ingestion service 110 can send the resulting processed stream(s) to an origination/packaging service 128 (e.g., that prepares and protects media for delivery over the Internet by creating streams formatted to play on connected TVs, mobile phones, computers, tablets, game consoles, etc., optionally implementing popular media features for viewers (e.g., start-over, pause, rewind), and/or protecting content using Digital Rights Management (DRM)). Alternatively, or additionally, the media ingestion service 110 can send the resulting processed stream(s), to one or more data stores 120 (non-illustrated) for later retrieval, and/or directly to a media distribution service such as a content delivery network service 130 (or media distribution service).

The CDN service 130 in some embodiments can stream or send the output of the media ingestion service 110 (or origination/packaging service 128) to one or more computer systems implementing clients 132 that render the media to viewers. The CDN service 130 can be a content delivery network with multiple, geographically dispersed locations to facilitate the timely delivery of media data to users (and, in the case of streaming media to users, reduce the network distance to reduce the likelihood of transmission problems).

As described herein, the media processing service 108 can enable its users to easily distribute various types of media, such as live video, to potentially many different clients and types of clients. For distributing live video, users typically use a continuous "stream" where the data is captured (or generated) at a source and continually sent (e.g., via one or more networks 106 such as the internet) to the media processing service 108 for processing—e.g., into different formats, resolutions, frame rates, etc. For example, a decoder 144 may decode the input media stream into a common format that can be re-encoded by encoder(s) 116 into one or more other formats, resolutions, etc. (e.g., more suitable for playback by clients 132), which may optionally be packaged by a packaging service 128 and optionally served via a CDN service 130 to clients 132. However, as this input media stream data is sent over one or more networks—and especially "public" networks like the internet that serve traffic from many different users—there sometimes can be network-based issues where certain elements of the input media stream may be delayed or missing from the perspective of the media processing service 108.

In some embodiments, to accommodate minor disruptions and delays like these, a relatively small buffer of frames (e.g., frame buffers 124, which could store frames making up a fraction of a second to many seconds worth of playback) is used to hold frames awaiting processing so that small, occasional delays only partially deplete the buffer awaiting processing, eliminating impact on the end viewers. In most scenarios, the buffer may then remain partially full or slowly refill over time, and end viewers will not be affected by small delays due to the use of this buffer as processing and distribution of the stream continues at its regular rate.

However, when issues arise (e.g., network congestion or failure issues, technical issues with the video source, etc.) that cause delays larger than the buffer size, the buffer may completely empty and as a result the end viewer will experience a noticeable disruption of service. For example, while viewing a live stream of a soccer game, when such issues arise the viewers of the stream may completely "lose" the live video for a period of time, potentially missing significant happenings in the game being broadcast, such as the occurrence of a goal or penalty.

Technically, in these scenarios processing systems may simply introduce "blank" frames (e.g., all black or white) into the stream when no frames are ready to be sent downstream. Though this prevents a "broken" stream, it still results in a significant disruption for the end viewers, who encounter a disruption as their video effectively stalls or disappears for a period of time. Another approach that can be implemented would be to repeat or replay a previous frame (or frames) one or more times until "new" frames of the input media stream become available. Although this can be tolerable to viewers for some types of video that do not change much from moment to moment (such as a newscast or interview show), this approach still especially impacts the experience of watching streams with video content that may substantially change from frame to frame, such as in fast-moving sports, action movies, or other types of videos having lots of movement, scene changes, or rapid camera movement.

Embodiments address such scenarios using a data-driven approach utilizing machine learning techniques to predict the content of frames that are missing and insert these predicted frames into the video streams. As shown in FIG. 1, one or more "source" electronic devices 107 send an input media stream 112 (or "source" media stream) to the media processing service 108 for processing at circle (1A), which may include sending the input media stream 112 to the media ingestion service 110 where the input media stream 112 elements are placed into frame buffers 124 (or in other cases, processed into frames from another format—such as segments—and then placed into the frame buffers 124). Optionally, depending on the system architecture and the placement of various components, the input media stream 112 itself (or frames derived therefrom) may also be provided at circle (1B) to a frame predictor 120 by sending additional copies of the input media stream 112 elements to the frame predictor 120 (e.g., by the provider network 100 or media processing service 108) or additional copies of the frames (e.g., from the decoder 114).

When a network or other problem affects the delivery of the input media stream 112, the amount of frames in the frame buffers 124 will diminish due to frames in the buffer (s) being processed and removed faster than new frames are being placed into the buffer(s). If this condition exists for too long, the buffers will run "empty" and nothing will be available to be placed into the stream.

Accordingly, a frame loss detector 126 of the media ingestion service 110 may monitor the frame buffers 124 to detect a point at which corrective action is to be performed, e.g., via generating an additional one or more frames and using those one or more frames within the stream in place of the missing or delayed frames. This detection point may be determined in a variety of ways, for example, by determining when a number of frames in a buffer falls beneath a threshold number of frames (e.g., less than twenty), a percentage utilization of the buffer falls beneath a threshold (e.g., less than ten percent), etc. The detection point may additionally or alternatively be based on a measured rate at which new frames are arriving as part of the stream, e.g., the incoming rate is less than a threshold number of frames per second (e.g., less than ten frames per second). The threshold may be configured based on an expected time needed to generate and obtain an predicted replacement frame (or frames) such that it is unlikely for the set of frame buffers 124 to completely empty without having replacement frames available (for at least a period of time), which ensures satisfactory stream quality for clients 132.

Thus, upon detecting a frame loss condition (e.g., associated with the detection point described above) at circle (2), the frame loss detector 126 may cause a frame predictor to generate one or more replacement frames (also referred to herein as "predicted" or "inferred" frames). For example, the frame loss detector 126 may cause a transmission of a request to a frame predictor 120 to generate one or more frames, where the request specifies one or more timestamps (or timestamp ranges, or other frame identifiers) where frames are required to be generated.

In some embodiments, the request may further include or identify one or more frames of the input media stream 112 that have been received that will ultimately be used as input data (or used to generate input data) for one or more machine learning (ML) models 122 in generating one or more predicted frames. For example, the one or more frames may be a number of frames (e.g., five, ten) that are sequentially before/prior to the needed frame(s). However, in various embodiments, the one or more frames may include one or more "before" frames as well as one or more "after" frames, and in some embodiments the one or more frames may include only one or more "after" frames that correspond to points in time after the desired frame(s).

Regardless of the configuration, the frame predictor 120 may have access to this set of frames, whether they are carried within one or more messages making up the request, whether frame predictor 120 accesses them from another location as referenced by the request (e.g., the request includes identifiers, such as timestamps or a range thereof, associated with the frames), or whether the frame predictor 120 may simply identify the frames (from the forwarded input stream or a common memory location) based on other data from the request, such as by identifying a number of frames having timestamps prior to the requested replacement frame(s) timestamps.

The obtained frames are then used as inputs to one or more ML models 122, which have been trained to generate one or multiple predicted frames corresponding to a predicted "next" frame in the sequence. In some embodiments, the one or more ML models 122 includes a neural network type model, such as a convolutional neural network (CNN) type model (e.g., having one or more convolutional layers, pooling layers, fully-connected layers, etc.), Long short-term memory (LSTM) model, sequence-to-sequence (Seq2Seq) model, convolutional recurrent neural network (CRNN) model, etc., trained to generate a predicted "last" frame in a sequence (or, in some embodiments using different frames as input, a "middle" frame or "first" frame). For example, in some embodiments the neural network is trained using groups of frames of media from one or multiple domains, where a group of frames (e.g., five sequential frames) are provided as inputs and a last frame (e.g., a sixth frame in the sequence) is provided as a sample of what is to be predicted. Thus, for each of many example media content items, groupings of frames (e.g., six frames) can be obtained in a moving-window type process (e.g., using frames 1-6, then frames 2-7, then frames 3-8, and so on) and used as training data to train the neural network.

Figure 2:
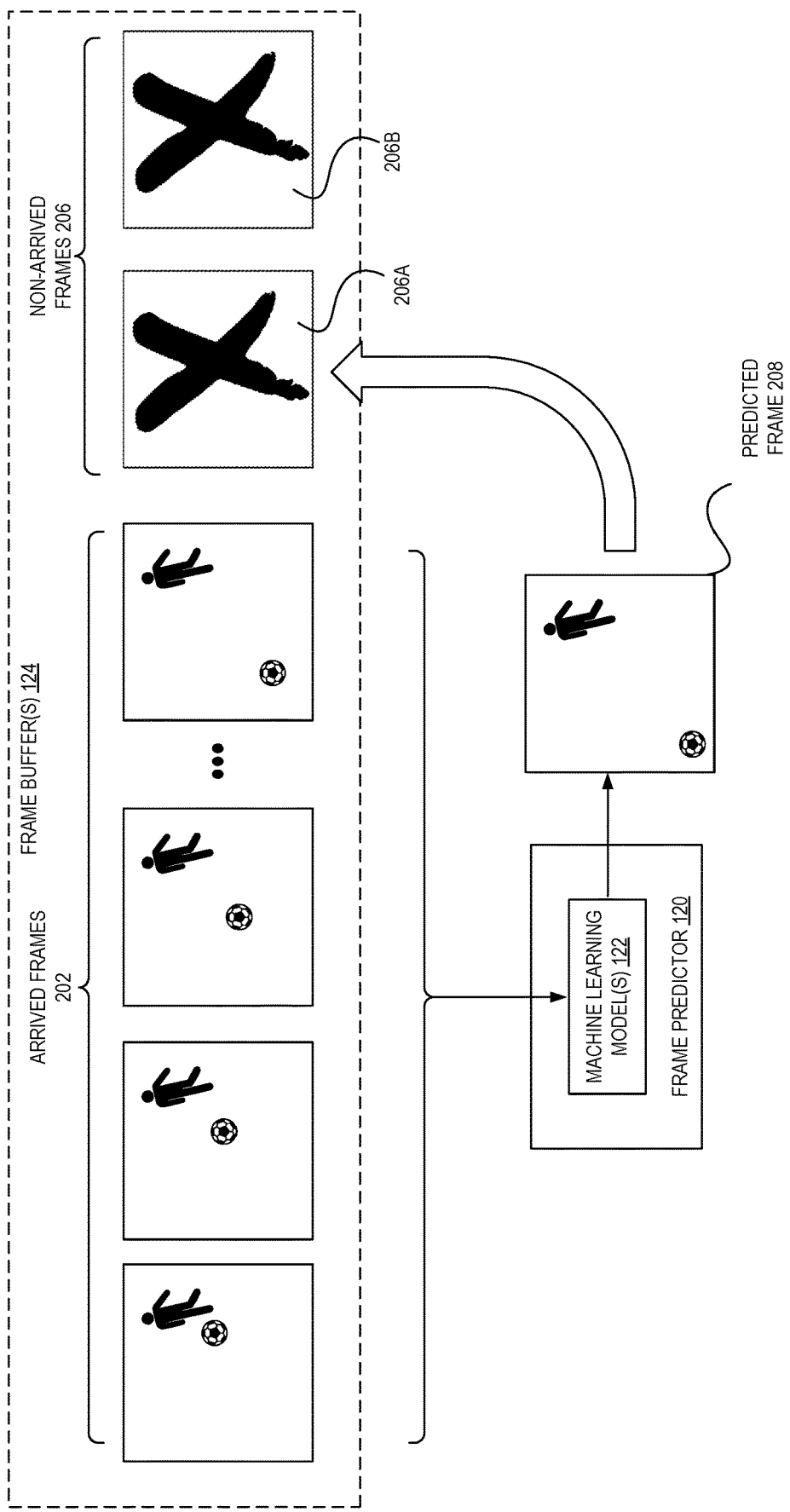
FIG. 2 is a diagram illustrating an exemplary environment for detecting a need for stream patching and predicted frame generation according to some embodiments.

For example, FIG. 2 is a diagram illustrating an exemplary environment for detecting a need for stream patching and predicted frame generation according to some embodiments. In this example, a number of arrived frames 202 (here, frames that arrived just prior to one or more non-arrived frames 206) are shown in frame buffers 124 that are used as inputs for a machine learning model 122 by the frame predictor 120 to generate a predicted "next" frame (i.e., predicted frame 208), which can be used in place of a corresponding non-arrived frame 206A. In this simple example, the one or more ML models 122 have thus learned how a soccer ball moves from the training process, and thus will infer that a next frame will include the ball continuing to move down and left compared to previous frames. With a sufficiently well-trained model, which may be trained in a domain specific manner (e.g., using only soccer videos to train a model for use in inferring frames for a soccer stream), the resulting predicted frames may be very close in composition to the actual, non-arrived frame it corresponds to, allowing the client to have a better experience than compared to a more simple approach of displaying only blank frames or a repeated frame.

In some embodiments, the one or more ML models 122 generate exactly one predicted frame 208, but in other embodiments one or more ML models 122 generate more than one predicted frame 208 (e.g., "top N" frames), and the selection of which frame to be used may be made according to a system configuration (e.g., always use a particular frame) or user preference (e.g., prefer a frame that is generally more color matched, prefer a frame that has a highest accuracy, etc.). In this case, the single frame may be identified and returned, or all N frames may be returned and logic used at the destination (e.g., the encoder or decoder) can perform the selection.

Returning to FIG. 1, in some embodiments, an predicted frame (or frames) are returned to the decoder 114 at circle (4), optionally processed further, and passed on to the encoder(s) 116 as if the predicted frame actually is the next frame in the stream, where processing continues according to the typical workflow. In other embodiments, the predicted frame (or frames) are returned to the encoder 116 instead, eliminating the decoder 114 from needing to be involved.

At some point, the delayed frames may actually be received at the media processing service 108. Depending on system configuration (or user 102 configuration), these frames may be dropped (i.e., those frames that have already had corresponding predicted frames sent in their place may be ignored) or replayed (i.e., the "actual" input media stream is played, which may lead to a brief "replay" where a set of predicted frames are followed by a set of likely-similar actual frames after each other).

Additionally, in some embodiments the media ingestion service 110 further includes a stream domain predictor 118. The stream domain predictor 118, optionally, can analyze elements (e.g., frames, metadata, etc.) associated with the input media stream 112 to identify a domain of the content of the stream. A domain may be a type or category of content represented within the stream, and for video may include broad categories such as sports or news, or more specific categories such as professional basketball, a particular game show, a fish tank, a video game, etc. The stream domain predictor 118 may utilize a machine learning model such as a classifier trained to identify a domain class based on frames from the input media stream, for example, or comparison logic to compare frames of the input media stream against a library of frames with known domain labels. Based on the predicted domain membership, the stream domain predictor 118 may notify the decoder 114 of the predicted domain so that the decoder 114 can send a request for use of a specific one of the machine learning models 122 that corresponds to the domain (e.g., that was trained using domain-specific data), which may include sending the request to a particular endpoint corresponding to the domain, including a domain identifier within the request (that the frame predictor can use to identify the requested ML model 122), etc. Alternatively, the stream domain predictor 118 may directly notify the frame predictor 120 of the predicted domain to set a specific one of the machine learning models 122 that corresponds to the domain (e.g., that was trained using domain-specific data) to be the active model.

As depicted, these media stream patching techniques may be implemented using a media processing service 108 within a provider network 100. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

As shown with reference to FIG. 2, an predicted frame may be generated based on one or more previous frames. In some embodiments, the decoder 114 may successively, one or more times as needed, continue to ask to frame predictor 120 (via the request) for another frame (e.g., immediately after the previously predicted frame slot). Alternatively, the decoder 114 in some embodiments may ask the frame predictor 120 (via an indicator in the request) for multiple frames, e.g., a block of five or ten frames, or for a custom number of frames). In some embodiments, the inputs for generating successive predicted frames is based on previously predicted frames. For example, in some embodiments an predicted frame for non-arrived frame 206B may be based on previously predicted frame 208 as well as actually-arrived frames 202. In some embodiments, in such cases a larger number of the arrived frames 202 may be used as inputs (e.g., ten instead of five) along with the predicted frame 208 to avoid biasing the next-predicted frame too heavily on the recently-predicted frame 208, which is not actually a legitimate frame. In this manner—either one at a time or in batches—multiple predicted frames can be generated for insertion into the input stream.

Figure 3:
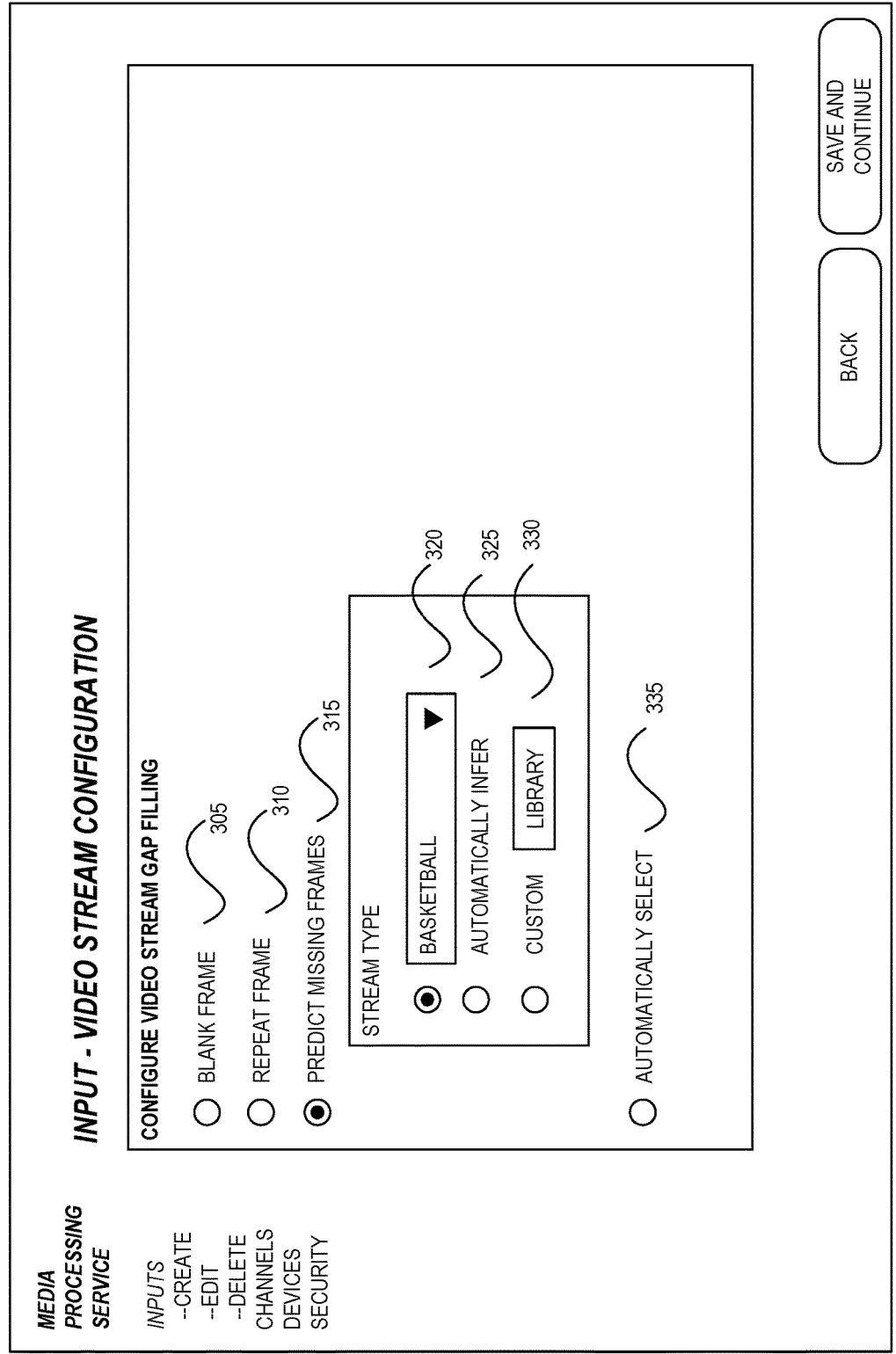
FIG. 3 is a diagram illustrating an exemplary user interface for configuring media stream patching using dynamic frame prediction according to some embodiments.

Moving ahead, FIG. 3 is a diagram illustrating an exemplary user interface 300 for configuring media stream patching using dynamic frame prediction according to some embodiments. As described herein, these techniques for "patching" missing frames may be enabled or controlled by a user 102 who owns or provides the input media stream 112. For example, the user 102 may utilize one or more interfaces provided via an electronic device 104 at circle (A) of FIG. 1 to configure the stream processing for the input media stream 112.

One such interface 300 is shown in FIG. 3, which allows a user to indicate how missing/delayed frames are to be handled, e.g., by indicating that blank/black frames should be inserted 305, that a last-received frame should be repeated 310, or that predicted frames should be inserted at 315. If the user selects this option, the user may optionally provide a domain identifier 320 associated with a class of content represented in the input media stream, which may allow for a particular ML model (e.g., associated with the domain) to be selected for use in inferring frames. The user may also indicate that the domain should be automatically inferred at 325, in which case the stream domain predictor 118 may be invoked to analyze the stream and determine the domain (and thus, the model for use) automatically. The user may also indicate that the stream type is a custom type, and use a user interface input element (here, a button that opens another user interface such as a file selector or navigator) to provide or select a set of media items (e.g., recorded videos) that are similar to the input media stream at issue. For example, if the user is configuring an input media stream that is a tennis match at a particular stadium, the user may provide a number of video recordings of other tennis matches held at that same (or similar stadiums), at a same or similar camera angle, in the same or similar weather conditions, etc., to allow for a custom ML model to be trained (or an existing model to be retrained) using this custom data to provide potentially superior predicted frame generation. In some embodiments, the user may also select an option to have the service automatically select (at 335) between blank frames, repeated frames, predicted frames, etc. The selection may then be made based by testing the performance of various ML models on the input stream and comparing the predicted frames to actual, "held out" frames. If the predicted frames are of a threshold amount of similarity (using a frame by frame difference computational technique), the model may be used to infer frames. Otherwise, the service may choose to repeat frames or insert blank frames. In some embodiments, with the automatic selection (at 335), the service may periodically perform this analysis, and thus during the life of the input stream the particular gap filling/patching technique may change at various points of time.

Figure 4:
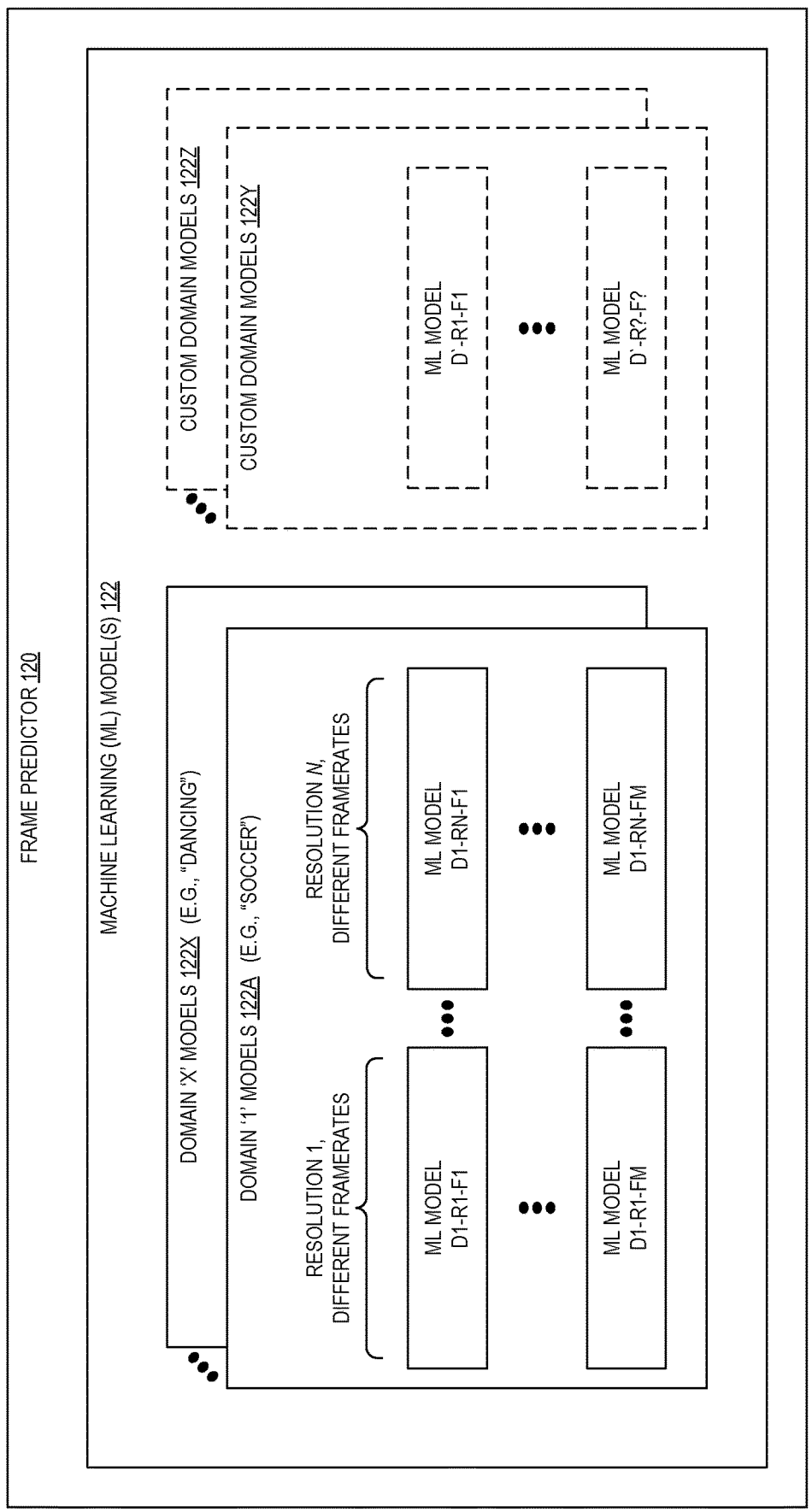
FIG. 4 is a diagram illustrating exemplary models useful for configuring media stream patching using dynamic frame prediction according to some embodiments.

FIG. 4 is a diagram illustrating exemplary models useful for configuring media stream patching using dynamic frame prediction according to some embodiments. As described herein, embodiments can utilize an array of multiple ML models to allow for improved performance in different contexts. In some embodiments the set of ML models 122 includes a number of different models for each of multiple domains. For example, a first set of domain '1' models 122A (e.g., corresponding to a domain of "soccer") may include models for different resolutions of frames (e.g., 1280×720 px (or 720p), 1,920×1,080 pixels (or 1080p), 3,840×2,160 pixels (or 4K), etc.), where for a particular resolution there may be different models for different framerates. The same or different numbers or types of models may similarly exist for other popular or common domains, such as domain 'X' models 122X corresponding to a "dancing" program. Accordingly, an ML model may be chosen and used for generating predicted frames based on the inferred or user-indicated domain of the input media stream, the resolution of the input media stream, the framerate of the input media stream, or other characteristics of the input media stream. Further, embodiments may also utilize custom domain models 122Y-122Z, where specialized ML models for user-specific domains, resolutions, framerates, etc., may be trained via user-provided or identified samples and deployed for use.

Figure 5:
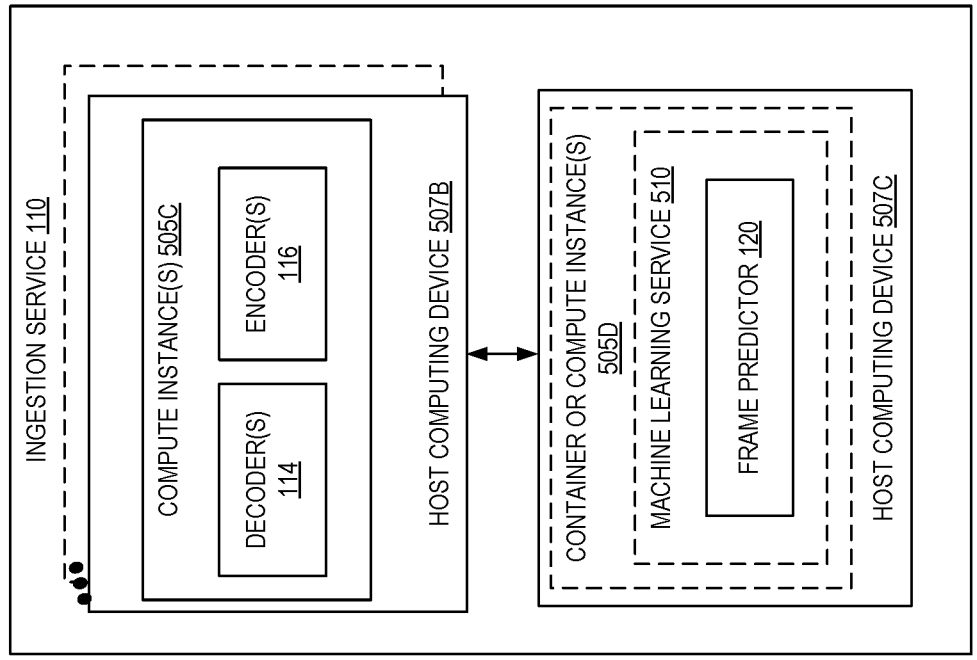
FIG. 5 is a diagram illustrating exemplary frame predictor deployments for media stream patching using dynamic frame prediction according to some embodiments.
Figure 5:
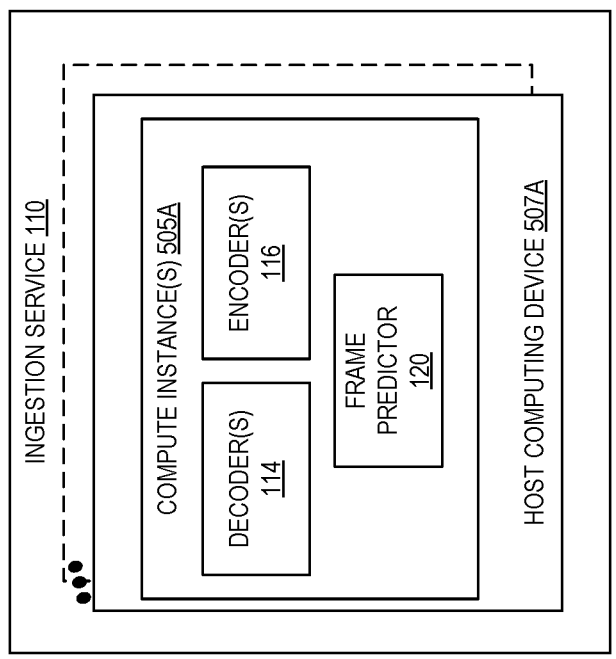

Beneficially, in various embodiments predicted frames can be generated via a frame predictor 120 deployed in different locations. FIG. 5 is a diagram illustrating exemplary frame predictor deployments for media stream patching using dynamic frame prediction according to some embodiments. In one deployment configuration 500, a set of one or more decoders 114, encoders 116, and the frame predictor 120 are all deployed within a same compute instance 505A (e.g., virtual machine) or group of multiple compute instances 505A executed by a host computing device 507A. In this deployment configuration 500, the frames of the input media stream can be easily provided to both the decoder 114 and frame predictor 120 (e.g., via shared memory locations, inter-process communications, etc.) and it may be the case that the decoder 114 and frame predictor 120 may not heavily use the processor(s) at a same point in time (or the frame predictor 120 may execute on a specialized chip or accelerator hardware) ensuring good overall performance.

Another deployment configuration 550 shown includes the decoder(s) and encoder(s) deployed on a same set of one or more container or compute instances 505C on a host computing device 507B that is distinct from another host computing device 507C implementing the frame predictor 120 via another one or more compute instances 505D (which may be, for example, operated by a machine learning service 510 described in further detail herein). Although this deployment configuration 550 requires network delays for communication between the decoder 114 and frame predictor 120, the frame predictor 120 may be deployed on specialized hardware allowing for extremely rapid inference frames to be generated, which may potentially offset the network delays, allow for more resource utilization on the part of the decoder(s) 114 and encoder(s) 116, etc.

Although embodiments described above generally focus upon the use of predicted frames for patching input media streams, these techniques can be adapted for other uses. For example, in some embodiments, videos having missing portions can be recovered by inferring frames for the missing portions. As another example, a framerate of a stream can be increased in small amounts, e.g., from 30 frames per second (FPS) to 35 FPS or higher, by inferring frames and inserting the predicted frames into the stream, without any frame replacement. This framerate boosting can be performed repeatedly, slowly increasing the framerate each iteration, until a much larger framerate is achieved.

Figure 6:
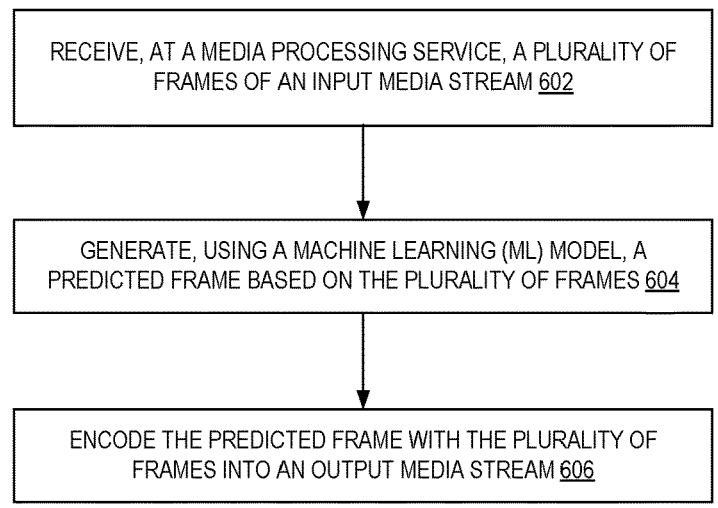
FIG. 6 is a flow diagram illustrating operations of a method for media stream patching using dynamic frame prediction according to some embodiments.

FIG. 6 is a flow diagram illustrating operations 600 of a method for media stream patching using dynamic frame prediction according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by media ingestion service 110 of the other figures.

The operations 600 include, at block 602, receiving, at a media processing service, a plurality of frames of an input media stream. The operations 600 further include, at block 604, generating, using a machine learning (ML) model, an predicted frame based on the plurality of frames. In some embodiments, the ML model comprises a neural network (e.g., a convolutional neural network (CNN), a long-short term memory network (LSTM). The operations 600 further include, at block 606, encoding the predicted frame with the plurality of frames into an output media stream.

In some embodiments, the operations 600 further include receiving, at a provider network, a message originated by a client associated with a user that indicates that the media processing service is to generate and insert predicted frames into the input media stream upon a frame loss condition. In some embodiments, the message further includes an indicator of a domain type, the domain type corresponding to a category of the content represented by the frames of the input media stream.

In some embodiments, the operations 600 further include inferring, based on an analysis of a second plurality of frames of the input media stream, a domain type, the domain type corresponding to a category of the content represented by the frames of the input media stream.

In some embodiments, the operations 600 further include selecting the ML model from a plurality of candidate ML models for use based at least in part on an indicator of a domain type associated with the input media stream. In some embodiments, the selecting of the ML model is further based at least in part on one or more of: a resolution of frames of the input media stream; or a framerate of the input media stream.

In some embodiments, the operations 600 further include determining that an amount of frames within a buffer falls beneath a threshold; and sending a request to a frame predictor to generate the predicted frame, wherein the predicted frame takes a place, within the output media stream, of an expected frame that did not yet arrive within the buffer.

In some embodiments, the operations 600 further include receiving the expected frame; and encoding the expected frame into the output media stream.

In some embodiments, the operations 600 further include generating, using the ML model, a second predicted frame based on the predicted frame and at least one or more of the plurality of frames. In some embodiments, generating the second predicted frame is further based on one or more additional frames received prior to the plurality of frames.

Figure 7:
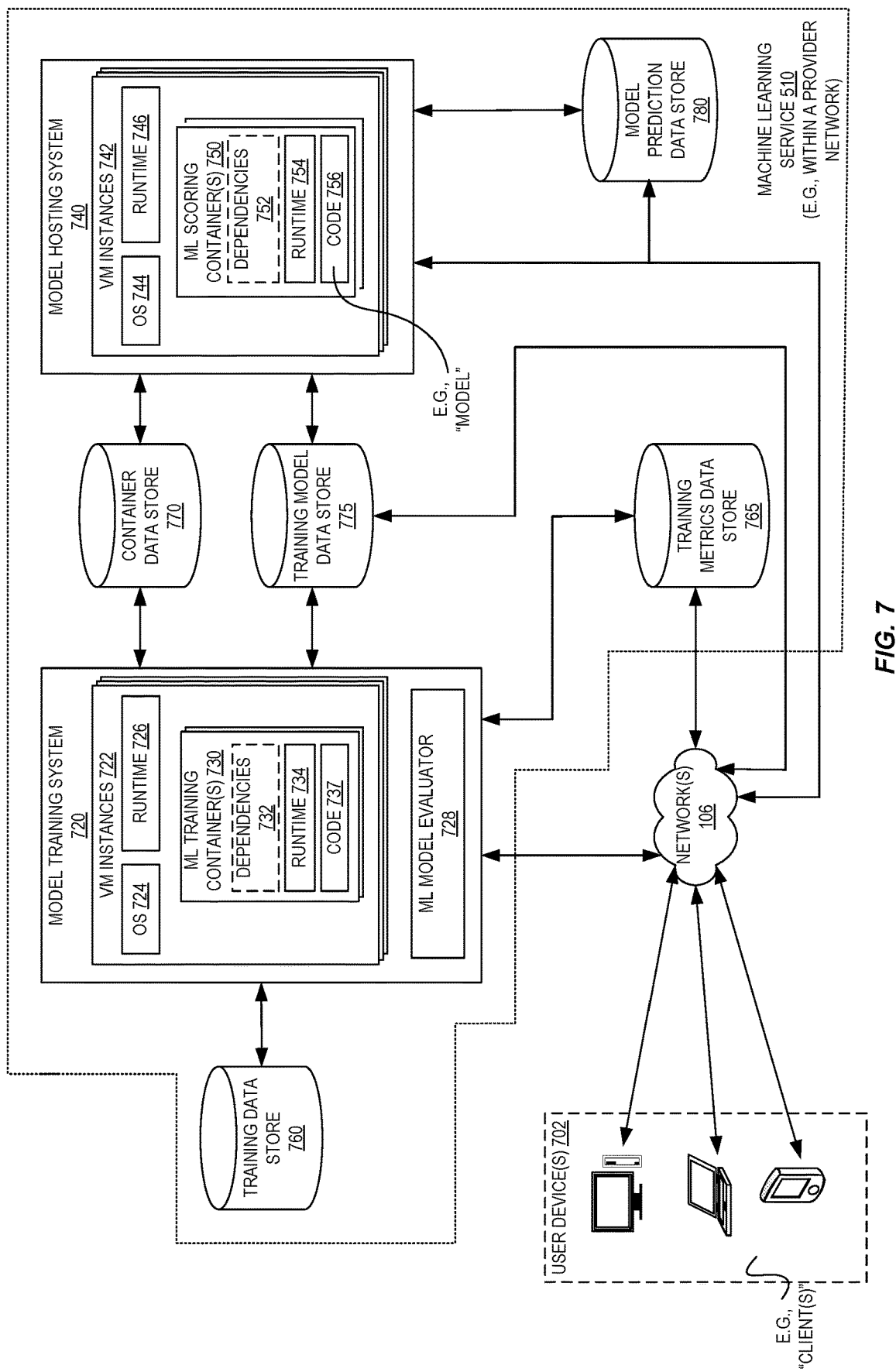
FIG. 7 is a block diagram of an illustrative operating environment in which machine learning models are trained and hosted according to some embodiments.

FIG. 7 is a block diagram of an illustrative operating environment in which machine learning models are trained and hosted according to some embodiments. The operating environment includes end user devices 702 (for example, electronic devices(s) 104/107), a model training system 720, a model hosting system 740, a training data store 760, a training metrics data store 765, a container data store 770, a training model data store 775, and a model prediction data store 780. A machine learning service 510 described herein may include one or more of these entities, such as the model hosting system 740, model training system 720, and so forth.

In some embodiments, users, by way of user devices 702, interact with the model training system 720 to provide data that causes the model training system 720 to train one or more machine learning models, for example, as described elsewhere herein. A machine learning model, generally, may be thought of as one or more equations that are "trained" using a set of data. In some embodiments, the model training system 720 provides ML functionalities as a web service, and thus messaging between user devices 702 and the model training system 720 (or provider network 100), and/or between components of the model training system 720 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 702 can interact with the model training system 720 via frontend 729 of the model training system 720. For example, a user device 702 can provide a training request to the frontend 729 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 702, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 702 may provide, in the training request, an algorithm written in any programming language. The model training system 720 then packages the algorithm into a container (optionally with other code, such as a "base" ML algorithm supplemented with user-provided code) that is eventually loaded into a virtual machine instance 722 for training a machine learning model, as described in greater detail below. For example, a user, via a user device 702, may develop an algorithm/code using an application (for example, an interactive web-based programming environment) and cause the algorithm/code to be provided—perhaps as part of a training request (or referenced in a training request)—to the model training system 720, where this algorithm/code may be containerized on its own or used together with an existing container having a machine learning framework, for example.

In some embodiments, instead of providing a container image in the training request, the user device 702 provides, in the training request, an indicator of a container image (for example, an indication of an address or a location at which a container image is stored). For example, the container image can be stored in a container data store 770, and this container image may have been previously created/uploaded by the user. The model training system 720 can retrieve the container image from the indicated location and create a container using the retrieved container image. The container is then loaded into a virtual machine instance 722 for training a machine learning model, as described in greater detail below.

The model training system 720 can use the information provided by the user device 702 to train a machine learning model in one or more pre-established virtual machine instances 722 in some embodiments. In particular, the model training system 720 includes a single physical computing device or multiple physical computing devices that are interconnected using one or more computing networks (not shown), where the physical computing device(s) host one or more virtual machine instances 722. The model training system 720 can handle the acquisition and configuration of compute capacity (for example, containers, instances, etc., which are described in greater detail below) based on the information describing the computing machine on which to train a machine learning model provided by the user device 702. The model training system 720 can then train machine learning models using the compute capacity, as is described in greater detail below. The model training system 720 can automatically scale up and down based on the volume of training requests received from user devices 702 via frontend 729, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 722 are utilized to execute tasks. For example, such tasks can include training a machine learning model. As shown in FIG. 7, each virtual machine instance 722 includes an operating system (OS) 724, a language runtime 726, and one or more ML training containers 730. Generally, the ML training containers 730 are logical units created within a virtual machine instance using the resources available on that instance and can be utilized to isolate execution of a task from other processes (for example, task executions) occurring in the instance. In some embodiments, the ML training containers 730 are formed from one or more container images and a top container layer. Each container image may further include one or more image layers, where each image layer represents an executable instruction. As described above, some or all of the executable instructions together represent an algorithm that defines a machine learning model. Changes made to the ML training containers 730 (for example, creation of new files, modification of existing files, deletion of files, etc.) are stored in the top container layer. If a ML training container 730 is deleted, the top container layer is also deleted. However, the container image(s) that form a portion of the deleted ML training container 730 can remain unchanged. The ML training containers 730 can be implemented, for example, as Linux containers (LXC), Docker containers, and the like.

The ML training containers 730 may include individual a runtime 734, code 737, and dependencies 732 needed by the code 737 in some embodiments. The runtime 734 can be defined by one or more executable instructions that form at least a portion of a container image that is used to form the ML training container 730 (for example, the executable instruction(s) in the container image that define the operating system and/or runtime to run in the container formed from the container image). The code 737 includes one or more executable instructions that form at least a portion of a container image that is used to form the ML training container 730. For example, the code 737 includes the executable instructions in the container image that represent an algorithm that defines a machine learning model, which may reference (or utilize) code or libraries from dependencies 732. The runtime 734 is configured to execute the code 737 in response to an instruction to begin machine learning model training Execution of the code 737 results in the generation of model data, as described in greater detail below.

In some embodiments, the code 737 includes executable instructions that represent algorithms that define different machine learning models. For example, the code 737 includes one set of executable instructions that represent a first algorithm that defines a first machine learning model and a second set of executable instructions that represent a second algorithm that defines a second machine learning model. In some embodiments, the virtual machine instance 722 executes the code 737 and trains all of the machine learning models. In some embodiments, the virtual machine instance 722 executes the code 737, selecting one of the machine learning models to train. For example, the virtual machine instance 722 can identify a type of training data indicated by the training request and select a machine learning model to train (for example, execute the executable instructions that represent an algorithm that defines the selected machine learning model) that corresponds with the identified type of training data.

In some embodiments, the runtime 734 is the same as the runtime 726 utilized by the virtual machine instance 722. In some embodiments, the runtime 734 is different than the runtime 726 utilized by the virtual machine instance 722.

In some embodiments, the model training system 720 uses one or more container images included in a training request (or a container image retrieved from the container data store 770 in response to a received training request) to create and initialize a ML training container 730 in a virtual machine instance 722. For example, the model training system 720 creates a ML training container 730 that includes the container image(s) and/or a top container layer.

Prior to beginning the training process, in some embodiments, the model training system 720 retrieves training data from the location indicated in the training request. For example, the location indicated in the training request can be a location in the training data store 760. Thus, the model training system 720 retrieves the training data from the indicated location in the training data store 760. In some embodiments, the model training system 720 does not retrieve the training data prior to beginning the training process. Rather, the model training system 720 streams the training data from the indicated location during the training process. For example, the model training system 720 can initially retrieve a portion of the training data and provide the retrieved portion to the virtual machine instance 722 training the machine learning model. Once the virtual machine instance 722 has applied and used the retrieved portion or once the virtual machine instance 722 is about to use all of the retrieved portion (for example, a buffer storing the retrieved portion is nearly empty), then the model training system 720 can retrieve a second portion of the training data and provide the second retrieved portion to the virtual machine instance 722, and so on.

To perform the machine learning model training, the virtual machine instance 722 executes code 737 stored in the ML training container 730 in some embodiments. For example, the code 737 includes some or all of the executable instructions that form the container image of the ML training container 730 initialized therein. Thus, the virtual machine instance 722 executes some or all of the executable instructions that form the container image of the ML training container 730 initialized therein to train a machine learning model. The virtual machine instance 722 executes some or all of the executable instructions according to the hyperparameter values included in the training request. As an illustrative example, the virtual machine instance 722 trains a machine learning model by identifying values for certain parameters (for example, coefficients, weights, centroids, etc.). The identified values depend on hyperparameters that define how the training is performed. Thus, the virtual machine instance 722 can execute the executable instructions to initiate a machine learning model training process, where the training process is run using the hyperparameter values included in the training request. Execution of the executable instructions can include the virtual machine instance 722 applying the training data retrieved by the model training system 720 as input parameters to some or all of the instructions being executed.

In some embodiments, executing the executable instructions causes the virtual machine instance 722 (for example, the ML training container 730) to generate model data. For example, the ML training container 730 generates model data and stores the model data in a file system of the ML training container 730. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 730 such that the model data is written to the top container layer of the ML training container 730 and/or the container image(s) that forms a portion of the ML training container 730 is modified to include the model data.

The virtual machine instance 722 (or the model training system 720 itself) pulls the generated model data from the ML training container 730 and stores the generated model data in the training model data store 775 in an entry associated with the virtual machine instance 722 and/or the machine learning model being trained. In some embodiments, the virtual machine instance 722 generates a single file that includes model data and stores the single file in the training model data store 775. In some embodiments, the virtual machine instance 722 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 722 can package the multiple files into a single file once training is complete and store the single file in the training model data store 775. Alternatively, the virtual machine instance 722 stores the multiple files in the training model data store 775. The virtual machine instance 722 stores the file(s) in the training model data store 775 while the training process is ongoing and/or after the training process is complete.

In some embodiments, the virtual machine instance 722 regularly stores model data file(s) in the training model data store 775 as the training process is ongoing. Thus, model data file(s) can be stored in the training model data store 775 at different times during the training process. Each set of model data files corresponding to a particular time or each set of model data files present in the training model data store 775 as of a particular time could be checkpoints that represent different versions of a partially-trained machine learning model during different stages of the training process. Accordingly, before training is complete, a user, via the user device 702 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 775.

In some embodiments, a virtual machine instance 722 executes code 737 stored in a plurality of ML training containers 730. For example, the algorithm included in the container image can be in a format that allows for the parallelization of the training process. Thus, the model training system 720 can create multiple copies of the container image provided in a training request and cause the virtual machine instance 722 to load each container image copy in a separate ML training container 730. The virtual machine instance 722 can then execute, in parallel, the code 737 stored in the ML training containers 730. The virtual machine instance 722 can further provide configuration information to each ML training container 730 (for example, information indicating that N ML training containers 730 are collectively training a machine learning model and that a particular ML training container 730 receiving the configuration information is ML training container 730 number X of N), which can be included in the resulting model data. By parallelizing the training process, the model training system 720 can significantly reduce the training time in some embodiments.

In some embodiments, a plurality of virtual machine instances 722 execute code 737 stored in a plurality of ML training containers 730. For example, the resources used to train a particular machine learning model can exceed the limitations of a single virtual machine instance 722. However, the algorithm included in the container image can be in a format that allows for the parallelization of the training process. Thus, the model training system 720 can create multiple copies of the container image provided in a training request, initialize multiple virtual machine instances 722, and cause each virtual machine instance 722 to load a container image copy in one or more separate ML training containers 730. The virtual machine instances 722 can then each execute the code 737 stored in the ML training containers 730 in parallel. The model training system 720 can further provide configuration information to each ML training container 730 via the virtual machine instances 722 (for example, information indicating that N ML training containers 730 are collectively training a machine learning model and that a particular ML training container 730 receiving the configuration information is ML training container 730 number X of N, information indicating that M virtual machine instances 722 are collectively training a machine learning model and that a particular ML training container 730 receiving the configuration information is initialized in virtual machine instance 722 number Y of M, etc.), which can be included in the resulting model data. As described above, by parallelizing the training process, the model training system 720 can significantly reduce the training time in some embodiments.

In some embodiments, the model training system 720 includes a plurality of physical computing devices and two or more of the physical computing devices hosts one or more virtual machine instances 722 that execute the code 737. Thus, the parallelization can occur over different physical computing devices in addition to over different virtual machine instances 722 and/or ML training containers 730.

In some embodiments, the model training system 720 includes a ML model evaluator 728. The ML model evaluator 728 can monitor virtual machine instances 722 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 728 can obtain the model data for a machine learning model being trained and evaluation data from the training data store 760. The evaluation data is separate from the data used to train a machine learning model and includes both input data and expected outputs (for example, known results), and thus the ML model evaluator 728 can define a machine learning model using the model data and execute the machine learning model by providing the input data as inputs to the machine learning model. The ML model evaluator 728 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 728 periodically generates model metrics during the training process and stores the model metrics in the training metrics data store 765 in some embodiments. While the machine learning model is being trained, a user, via the user device 702, can access and retrieve the model metrics from the training metrics data store 765. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time).

In response, in some embodiments, the user, via the user device 702, can transmit a request to the model training system 720 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 720 can modify the machine learning model accordingly. For example, the model training system 720 can cause the virtual machine instance 722 to optionally delete an existing ML training container 730, create and initialize a new ML training container 730 using some or all of the information included in the request, and execute the code 737 stored in the new ML training container 730 to restart the machine learning model training process. As another example, the model training system 720 can cause the virtual machine instance 722 to modify the execution of code stored in an existing ML training container 730 according to the data provided in the modification request. In some embodiments, the user, via the user device 702, can transmit a request to the model training system 720 to stop the machine learning model training process. The model training system 720 can then instruct the virtual machine instance 722 to delete the ML training container 730 and/or to delete any model data stored in the training model data store 775.

As described below, in some embodiments, the model data stored in the training model data store 775 is used by the model hosting system 740 to deploy machine learning models. Alternatively or additionally, a user device 702 or another computing device (not shown) can retrieve the model data from the training model data store 775 to implement a learning algorithm in an external device. As an illustrative example, a robotic device can include sensors to capture input data. A user device 702 can retrieve the model data from the training model data store 775 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 722 are shown in FIG. 7 as a single grouping of virtual machine instances 722, some embodiments of the present application separate virtual machine instances 722 that are actively assigned to execute tasks from those virtual machine instances 722 that are not actively assigned to execute tasks. For example, those virtual machine instances 722 actively assigned to execute tasks are grouped into an "active pool," while those virtual machine instances 722 not actively assigned to execute tasks are placed within a "warming pool." In some embodiments, those virtual machine instances 722 within the warming pool can be pre-initialized with an operating system, language runtimes, and/or other software required to enable rapid execution of tasks (for example, rapid initialization of machine learning model training in ML training container(s) 730) in response to training requests.

In some embodiments, the model training system 720 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model hosting system 740, etc.). The processing unit can also communicate to and from a memory of a virtual machine instance 722 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 740 includes a single physical computing device or multiple physical computing devices that are interconnected using one or more computing networks (not shown), where the physical computing device(s) host one or more virtual machine instances 742. The model hosting system 740 can handle the acquisition and configuration of compute capacity (for example, containers, instances, etc.) based on demand for the execution of trained machine learning models. The model hosting system 740 can then execute machine learning models using the compute capacity, as is described in greater detail below. The model hosting system 740 can automatically scale up and down based on the volume of execution requests received from user devices 702 via frontend 749 of the model hosting system 740, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 742 are utilized to execute tasks. For example, such tasks can include executing a machine learning model. As shown in FIG. 7, each virtual machine instance 742 includes an operating system (OS) 744, a language runtime 746, and one or more ML scoring containers 750. The ML scoring containers 750 are similar to the ML training containers 730 in that the ML scoring containers 750 are logical units created within a virtual machine instance using the resources available on that instance and can be utilized to isolate execution of a task from other processes (for example, task executions) occurring in the instance. In some embodiments, the ML scoring containers 750 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 750 (for example, creation of new files, modification of existing files, deletion of files, etc.) are stored in the top container layer. If a ML scoring container 750 is deleted, the top container layer is also deleted. However, the container image(s) that form a portion of the deleted ML scoring container 750 can remain unchanged. The ML scoring containers 750 can be implemented, for example, as Linux containers.

The ML scoring containers 750 each include a runtime 754, code 756, and dependencies 752 (for example, supporting software such as libraries) needed by the code 756 in some embodiments. The runtime 754 can be defined by one or more executable instructions that form at least a portion of a container image that is used to form the ML scoring container 750 (for example, the executable instruction(s) in the container image that define the operating system and/or runtime to run in the container formed from the container image). The code 756 includes one or more executable instructions that form at least a portion of a container image that is used to form the ML scoring container 750. For example, the code 756 includes the executable instructions in the container image that represent an algorithm that defines a machine learning model, which may reference dependencies 752. The code 756 can also include model data that represent characteristics of the defined machine learning model, as described in greater detail below. The runtime 754 is configured to execute the code 756 in response to an instruction to begin execution of a machine learning model. Execution of the code 756 results in the generation of outputs (for example, predicted results), as described in greater detail below.

In some embodiments, the runtime 754 is the same as the runtime 746 utilized by the virtual machine instance 742. In some embodiments, runtime 754 is different than the runtime 746 utilized by the virtual machine instance 742.

In some embodiments, the model hosting system 740 uses one or more container images included in a deployment request (or a container image retrieved from the container data store 770 in response to a received deployment request) to create and initialize a ML scoring container 750 in a virtual machine instance 742. For example, the model hosting system 740 creates a ML scoring container 750 that includes the container image(s) and/or a top container layer.

As described above, a user device 702 can submit a deployment request and/or an execution request to the model hosting system 740 via the frontend 749 in some embodiments. A deployment request causes the model hosting system 740 to deploy a trained machine learning model into a virtual machine instance 742. For example, the deployment request can include an identification of an endpoint (for example, an endpoint name, such as an HTTP endpoint name) and an identification of one or more trained machine learning models (for example, a location of one or more model data files stored in the training model data store 775). Optionally, the deployment request also includes an identification of one or more container images stored in the container data store 770.

Upon receiving the deployment request, the model hosting system 740 initializes ones or more ML scoring containers 750 in one or more hosted virtual machine instance 742. In embodiments in which the deployment request includes an identification of one or more container images, the model hosting system 740 forms the ML scoring container(s) 750 from the identified container image(s). For example, a container image identified in a deployment request can be the same container image used to form an ML training container 730 used to train the machine learning model corresponding to the deployment request. Thus, the code 756 of the ML scoring container(s) 750 includes one or more executable instructions in the container image(s) that represent an algorithm that defines a machine learning model. In embodiments in which the deployment request does not include an identification of a container image, the model hosting system 740 forms the ML scoring container(s) 750 from one or more container images stored in the container data store 770 that are appropriate for executing the identified trained machine learning model(s). For example, an appropriate container image can be a container image that includes executable instructions that represent an algorithm that defines the identified trained machine learning model(s).

The model hosting system 740 further forms the ML scoring container(s) 750 by retrieving model data corresponding to the identified trained machine learning model(s) in some embodiments. For example, the deployment request can identify a location of model data file(s) stored in the training model data store 775. In embodiments in which a single model data file is identified in the deployment request, the model hosting system 740 retrieves the identified model data file from the training model data store 775 and inserts the model data file into a single ML scoring container 750, which forms a portion of code 756. In some embodiments, the model data file is archived or compressed (for example, formed from a package of individual files). Thus, the model hosting system 740 unarchives or decompresses the model data file to obtain multiple individual files and inserts the individual files into the ML scoring container 750. In some embodiments, the model hosting system 740 stores the model data file in the same location as the location in which the model data file was stored in the ML training container 730 that generated the model data file. For example, the model data file initially was stored in the top container layer of the ML training container 730 at a certain offset, and the model hosting system 740 then stores the model data file in the top container layer of the ML scoring container 750 at the same offset.

In embodiments in which multiple model data files are identified in the deployment request, the model hosting system 740 retrieves the identified model data files from the training model data store 775. The model hosting system 740 can insert the model data files into the same ML scoring container 750, into different ML scoring containers 750 initialized in the same virtual machine instance 742, or into different ML scoring containers 750 initialized in different virtual machine instances 742. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 740 associates the initialized ML scoring container(s) 750 with the endpoint identified in the deployment request. For example, each of the initialized ML scoring container(s) 750 can be associated with a network address. The model hosting system 740 can map the network address(es) to the identified endpoint, and the model hosting system 740 or another system (for example, a routing system, not shown) can store the mapping. Thus, a user device 702 can refer to trained machine learning model(s) stored in the ML scoring container(s) 750 using the endpoint. This allows for the network address of an ML scoring container 750 to change without causing the user operating the user device 702 to change the way in which the user refers to a trained machine learning model.

Once the ML scoring container(s) 750 are initialized, the ML scoring container(s) 750 are ready to execute trained machine learning model(s). In some embodiments, the user device 702 transmits an execution request to the model hosting system 740 via the frontend 749, where the execution request identifies an endpoint and includes an input to a machine learning model (for example, a set of input data). The model hosting system 740 or another system (for example, a routing system, not shown) can obtain the execution request, identify the ML scoring container(s) 750 corresponding to the identified endpoint, and route the input to the identified ML scoring container(s) 750.

In some embodiments, a virtual machine instance 742 executes the code 756 stored in an identified ML scoring container 750 in response to the model hosting system 740 receiving the execution request. In particular, execution of the code 756 causes the executable instructions in the code 756 corresponding to the algorithm to read the model data file stored in the ML scoring container 750, use the input included in the execution request as an input parameter, and generate a corresponding output. As an illustrative example, the algorithm can include coefficients, weights, layers, cluster centroids, and/or the like. The executable instructions in the code 756 corresponding to the algorithm can read the model data file to determine values for the coefficients, weights, layers, cluster centroids, and/or the like. The executable instructions can include input parameters, and the input included in the execution request can be supplied by the virtual machine instance 742 as the input parameters. With the machine learning model characteristics and the input parameters provided, execution of the executable instructions by the virtual machine instance 742 can be completed, resulting in an output.

In some embodiments, the virtual machine instance 742 stores the output in the model prediction data store 780. Alternatively or in addition, the virtual machine instance 742 transmits the output to the user device 702 that submitted the execution result via the frontend 749.

In some embodiments, the execution request corresponds to a group of related trained machine learning models. Thus, the ML scoring container 750 can transmit the output to a second ML scoring container 750 initialized in the same virtual machine instance 742 or in a different virtual machine instance 742. The virtual machine instance 742 that initialized the second ML scoring container 750 can then execute second code 756 stored in the second ML scoring container 750, providing the received output as an input parameter to the executable instructions in the second code 756. The second ML scoring container 750 further includes a model data file stored therein, which is read by the executable instructions in the second code 756 to determine values for the characteristics defining the machine learning model. Execution of the second code 756 results in a second output. The virtual machine instance 742 that initialized the second ML scoring container 750 can then transmit the second output to the model prediction data store 780 and/or the user device 702 via the frontend 749 (for example, if no more trained machine learning models are needed to generate an output) or transmit the second output to a third ML scoring container 750 initialized in the same or different virtual machine instance 742 (for example, if outputs from one or more additional trained machine learning models are needed), and the above-referenced process can be repeated with respect to the third ML scoring container 750.

While the virtual machine instances 742 are shown in FIG. 7 as a single grouping of virtual machine instances 742, some embodiments of the present application separate virtual machine instances 742 that are actively assigned to execute tasks from those virtual machine instances 742 that are not actively assigned to execute tasks. For example, those virtual machine instances 742 actively assigned to execute tasks are grouped into an "active pool," while those virtual machine instances 742 not actively assigned to execute tasks are placed within a "warming pool." In some embodiments, those virtual machine instances 742 within the warming pool can be pre-initialized with an operating system, language runtimes, and/or other software required to enable rapid execution of tasks (for example, rapid initialization of ML scoring container(s) 750, rapid execution of code 756 in ML scoring container(s), etc.) in response to deployment and/or execution requests.

In some embodiments, the model hosting system 740 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model training system 720, etc.). The processing unit can also communicate to and from a memory of a virtual machine instance 742 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 720 and the model hosting system 740 depicted in FIG. 7 are not meant to be limiting. For example, the model training system 720 and/or the model hosting system 740 could also operate within a computing environment having a fewer or greater number of devices than are illustrated in FIG. 7. Thus, the depiction of the model training system 720 and/or the model hosting system 740 in FIG. 7 may be taken as illustrative and not limiting to the present disclosure. For example, the model training system 720 and/or the model hosting system 740 or various constituents thereof could implement various web services components, hosted or "cloud" computing environments, and/or peer-to-peer network configurations to implement at least a portion of the processes described herein. In some embodiments, the model training system 720 and/or the model hosting system 740 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 729 processes all training requests received from user devices 702 and provisions virtual machine instances 722. In some embodiments, the frontend 729 serves as a front door to all the other services provided by the model training system 720. The frontend 729 processes the requests and makes sure that the requests are properly authorized. For example, the frontend 729 may determine whether the user associated with the training request is authorized to initiate the training process.

Similarly, frontend 749 processes all deployment and execution requests received from user devices 702 and provisions virtual machine instances 742. In some embodiments, the frontend 749 serves as a front door to all the other services provided by the model hosting system 740. The frontend 749 processes the requests and makes sure that the requests are properly authorized. For example, the frontend 749 may determine whether the user associated with a deployment request or an execution request is authorized to access the indicated model data and/or to execute the indicated machine learning model.

The training data store 760 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 760 is depicted as being located external to the model training system 720 and the model hosting system 740, this is not meant to be limiting. For example, in some embodiments not shown, the training data store 760 is located internal to at least one of the model training system 720 or the model hosting system 740.

In some embodiments, the training metrics data store 765 stores model metrics. While the training metrics data store 765 is depicted as being located external to the model training system 720 and the model hosting system 740, this is not meant to be limiting. For example, in some embodiments not shown, the training metrics data store 765 is located internal to at least one of the model training system 720 or the model hosting system 740.

The container data store 770 stores container images, such as container images used to form ML training containers 730 and/or ML scoring containers 750, that can be retrieved by various virtual machine instances 722 and/or 742. While the container data store 770 is depicted as being located external to the model training system 720 and the model hosting system 740, this is not meant to be limiting. For example, in some embodiments not shown, the container data store 770 is located internal to at least one of the model training system 720 and the model hosting system 740.

The training model data store 775 stores model data files. In some embodiments, some of the model data files are comprised of a single file, while other model data files are packages of multiple individual files. While the training model data store 775 is depicted as being located external to the model training system 720 and the model hosting system 740, this is not meant to be limiting. For example, in some embodiments not shown, the training model data store 775 is located internal to at least one of the model training system 720 or the model hosting system 740.

The model prediction data store 780 stores outputs (for example, execution results) generated by the ML scoring containers 750 in some embodiments. While the model prediction data store 780 is depicted as being located external to the model training system 720 and the model hosting system 740, this is not meant to be limiting. For example, in some embodiments not shown, the model prediction data store 780 is located internal to at least one of the model training system 720 and the model hosting system 740.

While the model training system 720, the model hosting system 740, the training data store 760, the training metrics data store 765, the container data store 770, the training model data store 775, and the model prediction data store 780 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 702 via the one or more network(s) 106.

Various example user devices 702 are shown in FIG. 7, including a desktop computer, laptop, and a mobile phone, each provided by way of illustration. In general, the user devices 702 can be any computing device such as a desktop, laptop or tablet computer, personal computer, wearable computer, server, personal digital assistant (PDA), hybrid PDA/mobile phone, mobile phone, electronic book reader, set top box, voice command device, camera, digital media player, and the like. In some embodiments, the model training system 720 and/or the model hosting system 740 provides the user devices 702 with one or more user interfaces, command-line interfaces (CLI), application programming interfaces (API), and/or other programmatic interfaces for submitting training requests, deployment requests, and/or execution requests. In some embodiments, the user devices 702 can execute a stand-alone application that interacts with the model training system 720 and/or the model hosting system 740 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 8:
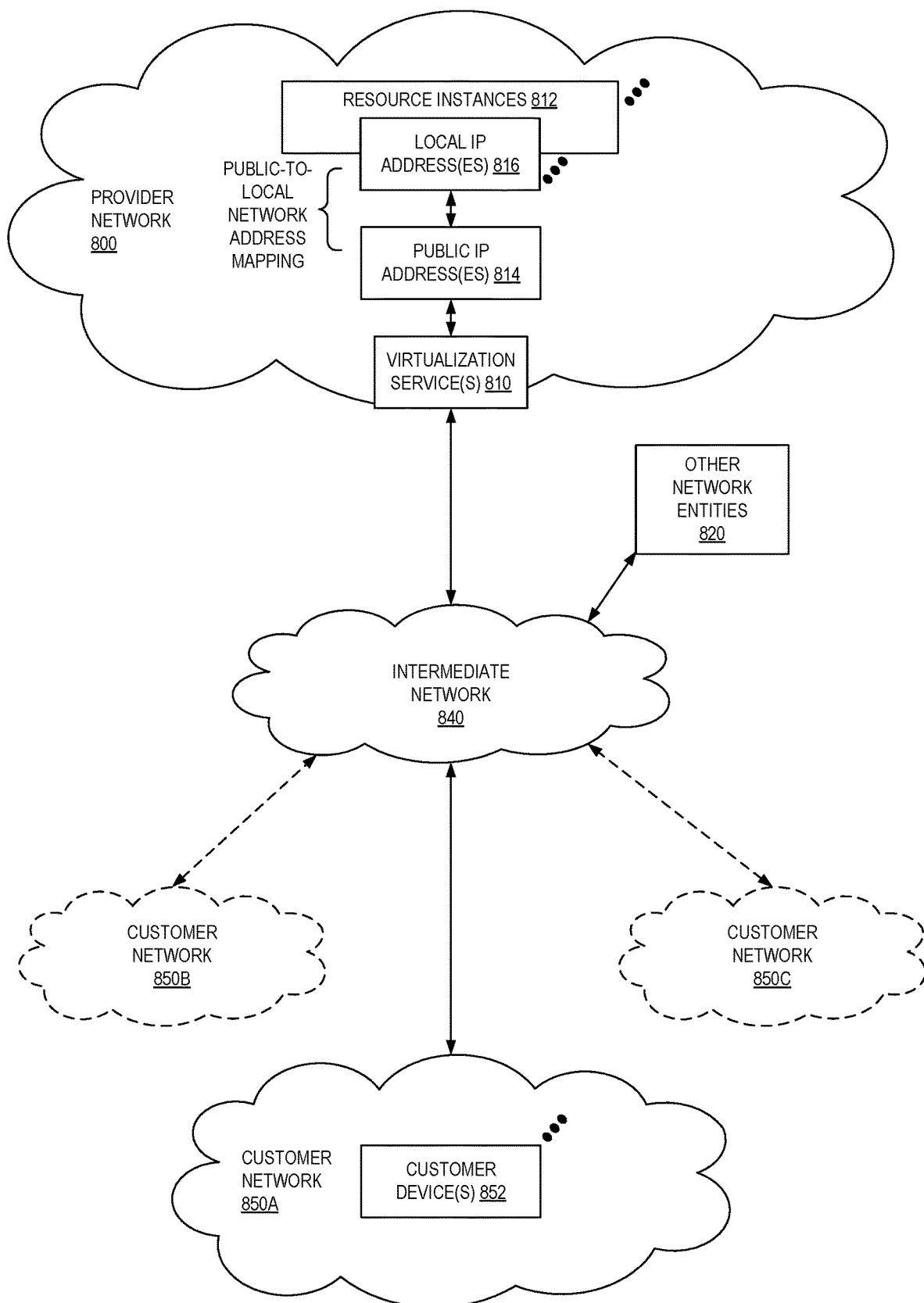
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
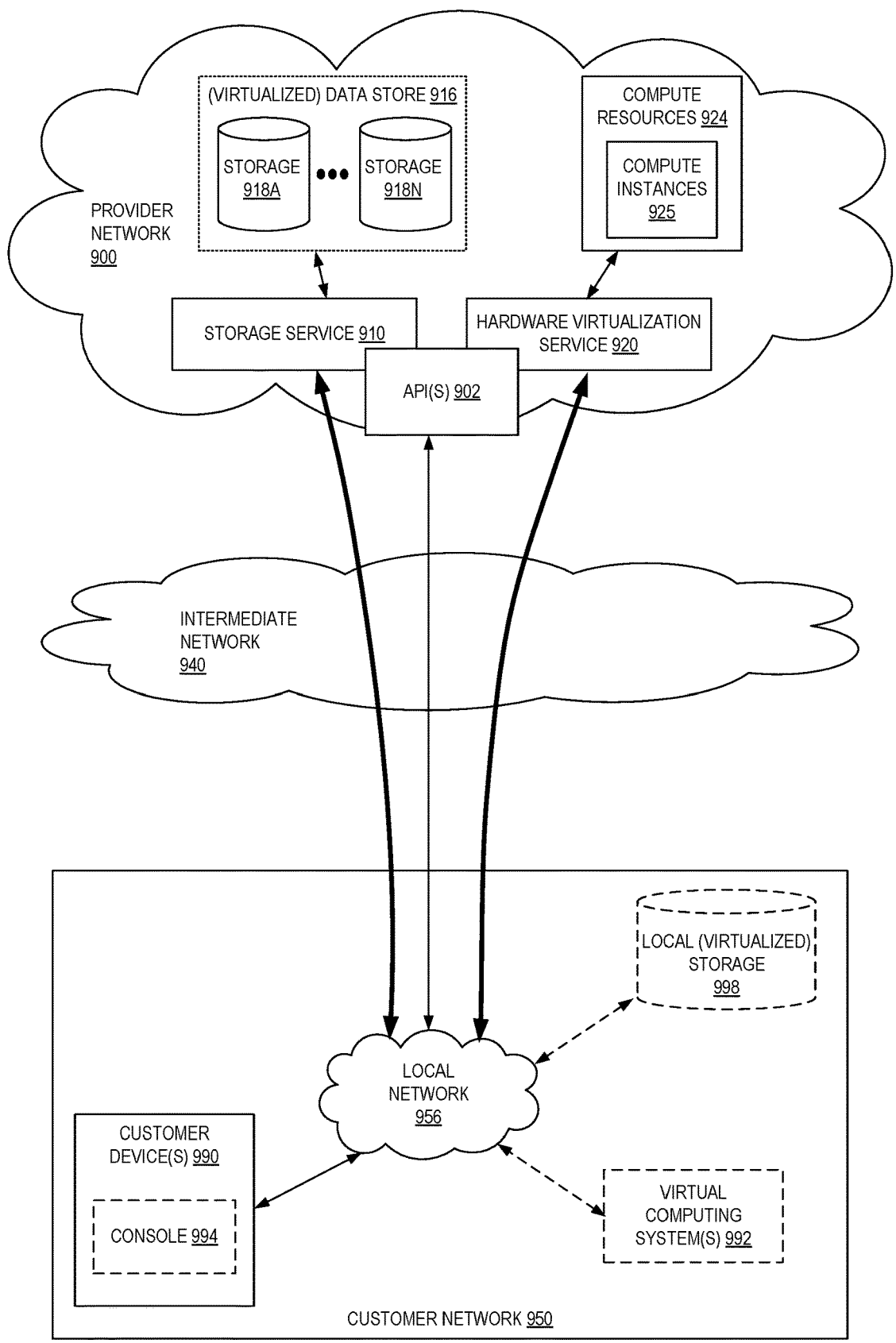
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple compute resources 924 (e.g., compute instances 925 such as VMs) to customers. The compute resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the compute resources 924 to public Internet destinations, and from public Internet sources to the local IP addresses of compute resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative Systems

Figure 10:
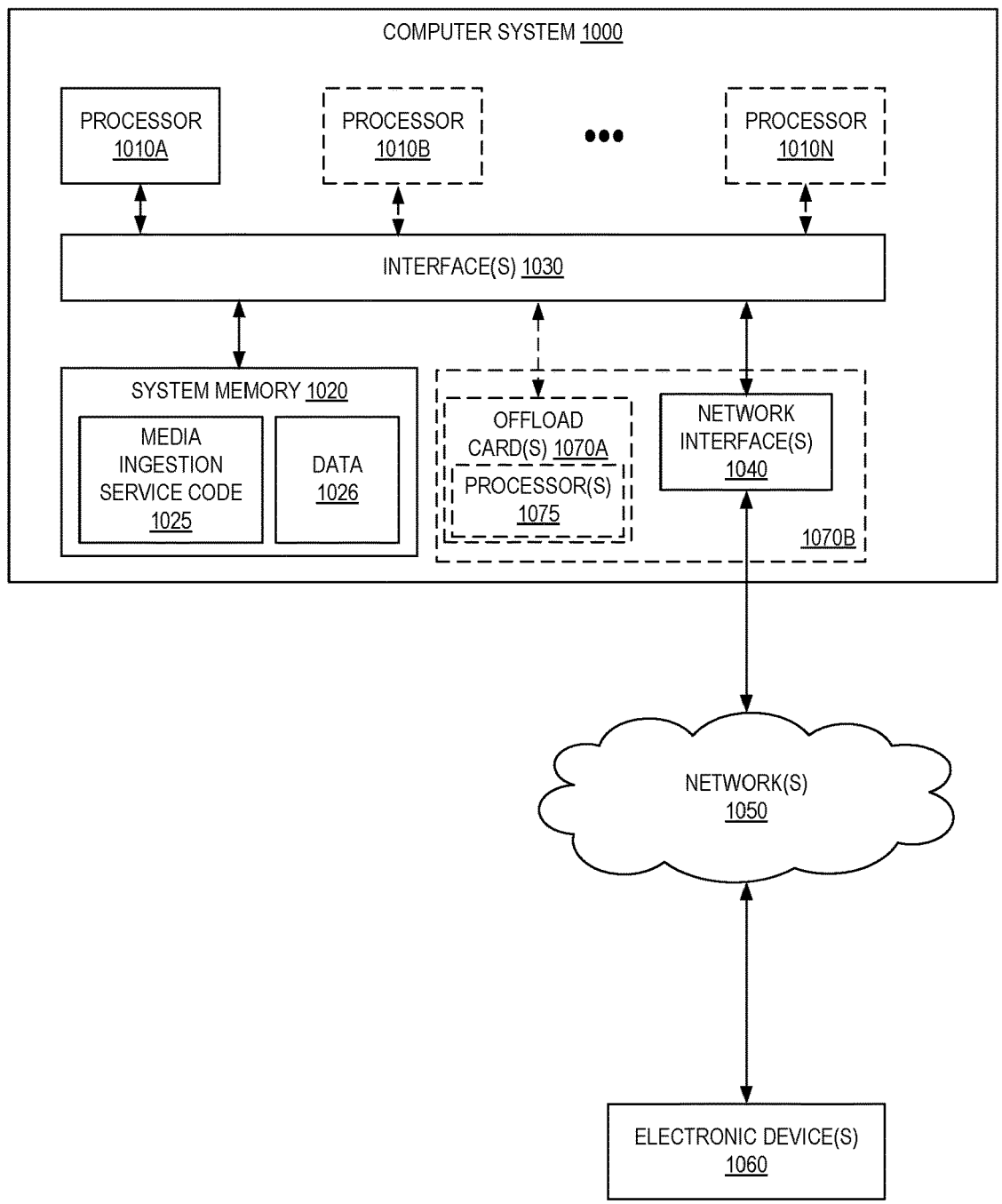
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as media ingestion service code 1025 (e.g., executable to implement, in whole or in part, the media ingestion service 110) and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070A or 1070B (including one or more processors 1075, and possibly including the one or more network interfaces 1040) that are connected using an I/O interface 1030 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some embodiments the offload card(s) 1070A or 1070B can perform compute instance management operations such as pausing and/or un-pausing compute instances, launching and/or terminating compute instances, performing memory transfer/copying operations, etc. These management operations may, in some embodiments, be performed by the offload card(s) 1070A or 1070B in coordination with a hypervisor (e.g., upon a request from a hypervisor) that is executed by the other processors 1010A-1010N of the computer system 1000. However, in some embodiments the virtualization manager implemented by the offload card(s) 1070A or 1070B can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving one or more messages originated by a computing device that indicates that a media processing service is to generate and insert predicted frames into an input media stream upon a frame loss condition, wherein the one or more messages further include an indicator of a domain type associated with the input media stream, the domain type corresponding to a category of content represented by the frames of the input media stream;
receiving, at the media processing service, a plurality of frames of the input media stream that were originated by a content source;
determining that the frame loss condition, associated with the input media stream, is satisfied;
selecting a machine learning (ML) model from a plurality of candidate ML models for use based at least in part on the indicator of the domain type;
generating, using the ML model, a predicted frame based on the plurality of frames;
encoding the predicted frame with the plurality of frames into an output media stream; and
causing the output media stream to be transmitted to one or more clients.

2. The computer-implemented method of claim 1, wherein the selecting of the ML model is further based at least in part on one or more of:
a resolution of frames of the input media stream; or
a framerate of the input media stream.

3. A computer-implemented method comprising:
receiving, at a provider network, a message originated by a client that indicates that a media processing service is to generate and insert predicted frames into an input media stream upon a frame loss condition, wherein the message includes an indicator of a domain type, the domain type corresponding to a category of content represented by the frames of the input media stream;
receiving, at the media processing service, a plurality of frames of the input media stream;
selecting a machine learning (ML) model from a plurality of candidate ML models for use based at least in part on the indicator of the domain type associated with the input media stream;
generating, using the ML model, a predicted frame based on the plurality of frames; and
encoding the predicted frame with the plurality of frames into an output media stream.

4. The computer-implemented method of claim 3, further comprising:
inferring, based on an analysis of a second plurality of frames of the input media stream, a domain type, the domain type corresponding to a category of the content represented by the frames of the input media stream.

5. The computer-implemented method of claim 3, wherein the selecting of the ML model is further based at least in part on one or more of:
a resolution of frames of the input media stream; or
a framerate of the input media stream.

6. The computer-implemented method of claim 3, further comprising:
determining that an amount of frames within a buffer falls beneath a threshold; and sending a request to a frame predictor to generate the predicted frame,
wherein the predicted frame takes a place, within the output media stream, of an expected frame that did not yet arrive within the buffer.

7. The computer-implemented method of claim 6, further comprising:
receiving the expected frame; and
encoding the expected frame into the output media stream.

8. The computer-implemented method of claim 3, further comprising:
generating, using the ML model, a second predicted frame based on the predicted frame and at least one or more of the plurality of frames.

9. The computer-implemented method of claim 8, wherein generating the second predicted frame is further based on one or more additional frames received prior to the plurality of frames.

10. The computer-implemented method of claim 3, wherein the ML model comprises a neural network.

11. A system comprising:
a first one or more electronic devices to implement a content distribution service; and
a second one or more electronic devices to implement a media processing service in a multi-tenant provider network, the media processing service including instructions that upon execution cause the media processing service to:
receive a message originated by a client that indicates that the media processing service is to generate and insert predicted frames into an input media stream, wherein the message further includes an indicator of a domain type corresponding to a category of content represented by the frames of the input media stream;
receive a plurality of frames of the input media stream;
select a ML model from a plurality of candidate ML models for use based at least in part on an indicator of a domain type associated with the input media stream;
generate, using the ML model, a predicted frame based on the plurality of frames;
encode the predicted frame with the plurality of frames into an output media stream; and
provide the output media stream to the content distribution service.

12. The system of claim 11, wherein the media processing service further includes instructions that upon execution cause the media processing service to:
infer, based on an analysis of a second plurality of frames of the input media stream, a domain type, the domain type corresponding to a category of the content represented by the frames of the input media stream.

13. The system of claim 11, wherein the selection of the ML model is further based at least in part on one or more of:
a resolution of frames of the input media stream; or
a framerate of the input media stream.

* * * * *